United States Patent
Breton et al.

[11] Patent Number: 5,626,654
[45] Date of Patent: May 6, 1997

[54] INK COMPOSITIONS CONTAINING LIPOSOMES

[75] Inventors: Marcel P. Breton; Jaan Noolandi; MaryAnna Isabella, all of Mississauga, Canada; Susanne Birkel, Glashutten, Germany; Gordon K. Hamer, Mississauga, Canada

[73] Assignee: Xerox Corporation, Stamford, Conn.

[21] Appl. No.: 567,464

[22] Filed: Dec. 5, 1995

[51] Int. Cl.$^6$ .................................................. C09D 11/02
[52] U.S. Cl. ............................ 106/31.33; 106/31.34; 347/100
[58] Field of Search .......................... 106/22 R, 22 E, 106/27 R

[56] References Cited

U.S. PATENT DOCUMENTS

| | | | |
|---|---|---|---|
| 4,783,220 | 11/1988 | Gamble et al. | 106/27 R |
| 4,877,451 | 10/1989 | Winnik et al. | 106/23 |
| 4,880,432 | 11/1989 | Egan et al. | 8/647 |
| 5,122,187 | 6/1992 | Schwarz et al. | 106/22 A |
| 5,139,574 | 8/1992 | Winnik et al. | 106/22 C |
| 5,145,518 | 9/1992 | Winnik et al. | 106/21 |
| 5,378,574 | 1/1995 | Winnik et al. | 430/115 |

Primary Examiner—Helene Klemanski
Attorney, Agent, or Firm—Judith L. Byorick

[57] ABSTRACT

Disclosed is an ink composition which comprises an aqueous liquid vehicle, a dye, and a vesicle-forming lipid, wherein vesicles of the lipid are present in the ink.

28 Claims, 1 Drawing Sheet

INK COMPOSITIONS CONTAINING LIPOSOMES

BACKGROUND OF THE INVENTION

The present invention is directed to ink compositions and printing processes. More specifically, the present invention is directed to ink compositions containing liposomes of a vesicle-forming lipid and a dye, and to printing processes employing said inks. One embodiment of the present invention is directed to an ink composition which comprises an aqueous liquid vehicle, a dye, and a vesicle-forming lipid, wherein vesicles of the lipid are present in the ink.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, they are much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

The second type of drop-on-demand system is known as thermal ink jet, or bubble jet, and produces high velocity droplets and allows very close spacing of nozzles. The major components of this type of drop-on-demand system are an ink-filled channel having a nozzle on one end and a heat generating resistor near the nozzle. Printing signals representing digital information originate an electric current pulse in a resistive layer within each ink passageway near the orifice or nozzle causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described, for example, in U.S. Pat. No. 4,601,777, U.S. Pat. No. 4,251,824, U.S. Pat. No. 4,410,899, U.S. Pat. No. 4,412,224, and U.S. Pat. No. 4,532,530, the disclosures of each of which are totally incorporated herein by reference.

Known ink jet inks generally comprise a water soluble dye which is soluble in an ink vehicle such as water or a mixture comprising water and a water soluble or water miscible organic solvent. Inks comprising soluble dyes may exhibit many problems, such as poor waterfastness, poor lightfastness, clogging of the jetting channels as a result of solvent evaporation and changes in the solubility of the dye, dye crystallization, ink bleeding when prints are formed on plain papers, poor thermal stability, chemical instability, ease of oxidation, and low drop velocity. In addition, many of the dyes contained in inks may be potentially toxic or mutagenic. These problems can be minimized by replacing the dyes used in ink formulations with insoluble pigments. In general, pigments are superior to dyes with respect to waterfastness, lightfastness, image density, thermal stability, oxidative stability, compatibility with both coated/treated and plain papers, image edge acuity, reduced image feathering, and non-toxic and non-mutagenic properties.

Heterophase inks containing pigment particles as colorants, however, also exhibit difficulties. For example, the particulate colorant may exhibit a tendency to settle out or separate from the liquid vehicle, particularly when the ink is stored for long periods of time. In addition, inks containing pigment particles as colorants tend to be opaque instead of transparent, which reduces their usefulness for printing images on transparencies for the purpose of overhead projection. Further, inks containing pigment particles as colorants tend to clog the narrow orifices of the printhead, resulting in deterioration of the print quality.

U.S. Pat. No. 4,877,451 (Winnik et al.), the disclosure of which is totally incorporated herein by reference, discloses ink jet ink compositions comprising water, a solvent, and a plurality of colored particles comprising hydrophilic porous silica particles to the surfaces of which dyes are covalently bonded through silane coupling agents. In addition, U.S. Pat. No. 5,378,574 (Winnik et al.), the disclosure of which is totally incorporated herein by reference, discloses ink jet inks and liquid developers containing colored particles comprising hydrophilic porous silica particles to the surfaces of which dyes are covalently bonded through silane coupling agents.

U.S. Pat. No. 5,145,518 (Winnik et al.), the disclosure of which is totally incorporated herein by reference, discloses an ink composition which comprises an aqueous liquid vehicle and particles of an average diameter of 100 nanometers or less which comprise micelles of block copolymers of the formula ABA, wherein A represents a hydrophilic segment and B represents a hydrophobic segment, and wherein dye molecules are covalently attached to the micelles. Optionally, silica is precipitated within the micelles. In a specific embodiment, the dye molecules are substantially colorless and the dye is detectable when exposed to radiation outside the visible wavelength range. In another specific embodiment, the ink also contains a colorant detectable in the visible wavelength range.

U.S. Pat. No. 4,880,432 (Egan et al.), the disclosure of which is totally incorporated herein by reference, discloses a process for preparing particles colored with a dye which comprises: (a) forming, by a free radical dispersion polymerization process in a nonaqueous solution, polymeric particles having attached thereto stabilizing copolymers with at least one functional group capable of undergoing a chemical reaction with a dye, the particles having an average diameter of from about 0.1 to about 20 microns; (b) adding a dye to the polymeric particles having attached thereto stabilizing copolymers; and (c) effecting a chemical reaction between the dye and the stabilizing copolymers that results in the dye becoming covalently bound to the polymeric particles. Also disclosed is a liquid electrophotographic developer composition comprising a liquid medium, a charge control agent, and colored polymeric toner particles prepared as stated above and having an average diameter of from about 0.5 to about 5 microns.

Copending application U.S. Ser. No. 08/567,637, filed concurrently herewith, entitled "Ink Compositions with Liposomes Containing Photochromic Compounds," with the named inventors Carol A. Jennings, Marcel P. Breton, Mary A. Isabella, Eric G. Johnson, Trevor I. Martin, and John F. Oliver, the disclosure of which is totally incorporated herein by reference, discloses an ink composition which comprises an aqueous liquid vehicle, a photochromic material, and a vesicle-forming lipid, wherein vesicles of the lipid are present in the ink.

Although known compositions are suitable for their intended purposes, a need remains for ink compositions exhibiting advantages of both dye-based inks and pigment-based inks. There is also a need for ink compositions with good waterfastness characteristics. A need also remains for ink compositions exhibiting good lightfastness characteristics. Further, there is a need for ink compositions that are non-toxic and non-mutagenic. In addition, a need exists for ink compositions for which a wide variety of color choices exists. There is also a need for ink compositions suitable for printing on plain papers, coated or treated papers, and transparency materials. A need also remains for ink compositions with good thermal and oxidative stability. Further, there is a need for ink compositions suitable for ink jet printing that jet well and do not induce clogging of the printhead. A need also remains for ink compositions that when printed on substrates exhibit no undesirable intercolor bleeding between areas of different color. In addition, there is a need for ink compositions suitable for printing on hot substrates.

SUMMARY OF THE INVENTION

It is an object of the present invention to provide ink compositions with the above advantages.

It is another object of the present invention to provide ink compositions exhibiting advantages of both dye-based inks and pigment-based inks.

It is yet another object of the present invention to provide ink compositions with good waterfastness characteristics.

It is still another object of the present invention to provide ink compositions exhibiting good lightfastness characteristics.

Another object of the present invention is to provide ink compositions that are non-toxic and non-mutagenic.

Yet another object of the present invention is to provide ink compositions for which a wide variety of color choices exists.

Still another object of the present invention is to provide ink compositions suitable for printing on plain papers, coated or treated papers, and transparency materials.

It is another object of the present invention to provide ink compositions with good thermal and oxidative stability.

It is yet another object of the present invention to provide ink compositions suitable for ink jet printing that jet well and do not induce clogging of the printhead.

It is still another object of the present invention is to provide ink compositions that when printed on substrates exhibit no undesirable intercolor bleeding between areas of different color.

Another object of the present invention is to provide ink compositions suitable for printing on hot substrates.

These and other objects of the present invention (or specific embodiments thereof) can be achieved by providing an ink composition which comprises an aqueous liquid vehicle, a dye, and a vesicle-forming lipid, wherein vesicles of the lipid are present in the ink. In one embodiment, the dye is covalently attached to the vesicle-forming lipid. In another embodiment, the vesicles are polymerized.

DETAILED DESCRIPTION OF THE INVENTION

The ink compositions of the present invention comprise an aqueous liquid vehicle, a dye, and a vesicle-forming lipid, wherein vesicles of the lipid are present in the ink. The liquid vehicle can consist solely of water, or it can comprise a mixture of water and a water soluble or water miscible organic component, such as ethylene glycol, propylene glycol, diethylene glycol, glycerine, dipropylene glycol, polyethylene glycols, polypropylene glycols, amides, ethers, carboxylic acids and their salts, esters, alcohols, organosulfides, organosulfoxides, sulfones, alcohol derivatives, hydroxyether derivatives such as butyl carbitol or cellusolve, amino alcohols, ketones, polyelectrolytes, and other water soluble or water miscible materials, as well as mixtures thereof. When mixtures of water and water soluble or miscible organic liquids are selected as the liquid vehicle, the water to organic ratio typically ranges from about 100:0 to about 30:70, and preferably from about 97:3 to about 40:60. The non-water component of the liquid vehicle generally serves as a humectant which has a boiling point higher than that of water (100° C.). In the ink compositions of the present invention, the liquid vehicle is typically present in an amount of from about 80 to about 99.9 percent by weight of the ink, and preferably from about 90 to about 99 percent by weight of the ink, although the amount can be outside these ranges.

Figure 1:
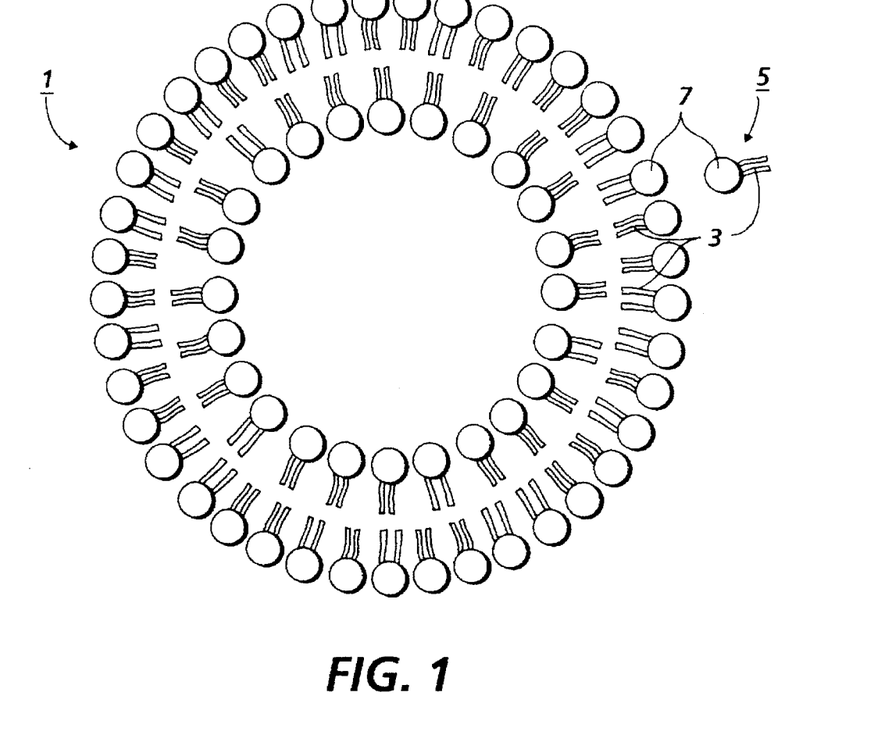
FIG. 1 illustrates schematically a liposome or vesicle having a single bilayered membrane in an aqueous ink of the present invention.
Figure 2:
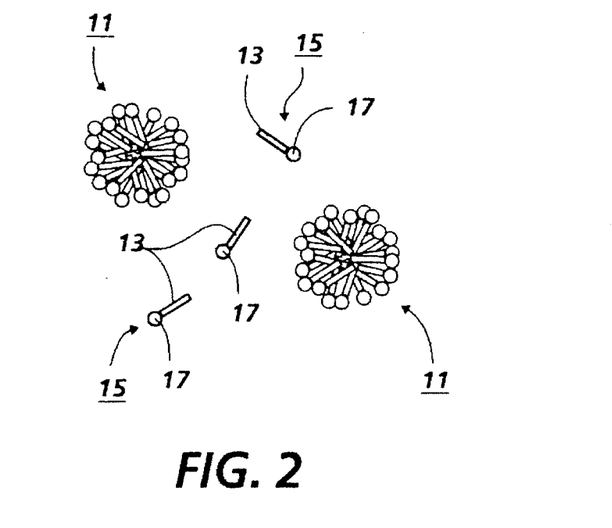
FIG. 2 illustrates schematically a micelle formed of surfactant molecules in aqueous solution.

The inks of the present invention also contain vesicles, or liposomes, of a vesicle-forming lipid. Lipids in general are substances that are soluble in organic solvents but are only sparingly soluble or insoluble in water. Lipids are generally classified according to their backbone structure, and include fatty acids, triacylglycerols, glycerophospholipids, sphingolipids, steroids, and the like. Vesicle-forming lipids usually have two nonpolar "tail" groups attached to a polar "head" group. In aqueous media, vesicle-forming lipids align themselves closely in planar bilayer sheets to minimize the unfavorable interactions between the bulk aqueous phase and the nonpolar groups. These up, unfavorable interactions are further reduced when the sheets fold on themselves to form closed sealed vesicles known as liposomes. As illustrated in FIG. 1, in aqueous solution a vesicle 1 is formed having a bilayered membrane of lipid molecules 5 having nonpolar ends 3 and polar ends 7, wherein polar ends 7 form both the exterior surface of the vesicle and the interior surface of the vesicle and nonpolar ends 3 form the inner structure of the bilayered membrane. These bilayered structures of vesicle-forming lipids tend to form in preference to micellar structures because the two nonpolar groups tend to impart to the molecule an overall tubular shape, which is more suitable for this type of aggregation. In contrast, surfactant molecules, which are also amphiphilic but which typically contain only one nonpolar "tail" group attached to a polar "head" group, form spherical micelles above their critical micelle concentration. The conical shape of the surfactant molecules enables formation of aggregations in a spherical micelle. As illustrated schematically in FIG. 2, micelles 11 formed in aqueous solution of surfactant molecules 15 and having nonpolar ends 13 and polar ends 17, are of a solid "ball" type structure. In contrast, vesicles or liposomes are of a hollow "bag" type structure.

Liposomes are able to entrap materials both within the inner compartment of the "bag" structure and between the layers of the bilayer membrane. In addition, some liposomes have more than one bilayer membrane, wherein the membranes form concentrically; in this instance, materials can also be entrapped between the bilayer membranes.

Glycerophospholipids are the major lipid component of biological membranes and consist of sn-glycerol-3-phosphate esterified at its C(1) and C(2) positions to fatty acids and at its phosphoryl group to a polar head group X:

wherein $R_1$ and $R_2$ are aliphatic hydrocarbons, preferably with from about 6 to about 20 carbon atoms, although the number of carbon atoms can be outside this range. Glycerophospholipids are amphiphilic molecules with nonpolar aliphatic tails ($R_1$ and $R_2$) and polar phosphoryl-X heads. Examples of common classes of glycerophospholipids include phosphatidic acids, wherein X is a hydrogen atom, phosphatidylethanolamines, wherein X is $-CH_2CH_2NH_3^+$, phosphatidylcholines, wherein X is $-CH_2CH_2N(CH_3)_3^+$, phosphatidylserines, wherein X is $-CH_2CH(NH_3^+)COO^-$, phosphatidylinositols, wherein X is phosphatidylglycerols, wherein X is $-CH_2CH(OH)$ $CH_2OH$, diphosphatidylglycerols, wherein X is and the like. $R_1$ and $R_2$ (as well as $R_3$ and $R_4$ in the diphosphatidylglycerols) generally are hydrocarbon groups, preferably with from about 6 to about 20 carbon atoms and more preferably with from about 10 to about 18 carbon atoms, although the number of carbon atoms can be outside these ranges. The R groups can be either saturated or non-conjugated unsaturated hydrocarbons. Suitable counterions accompany any charged atoms when X does not contain a net positive charge. Examples of suitable anions include $Cl^-$, $Br^-$, $I^-$, $HSO_4^-$, $SO_4^{2-}$, $NO_3^-$, $HCOO^-$, $CH_3COO^-$, $HCO_3^-$, $CO_3^{2-}$, $H_2PO_4^-$, $HPO_4^{2-}$, $PO_4^{3-}$, $SCN^-$, $BF_4^-$, $ClO_4^-$, $SSO_3^-$, $CH_3SO_3^-$, $CH_3C_6H_4SO_3^-$, or the like, as well as mixtures thereof. Specific examples of glycerolphospholipids include 1,2-dimyristoyl-sn-glycero-3-phosphocholine, wherein $R_1$ and $R_2$ are each $-(CH_2)_{12}CH_3$ and X is $-CH_2CH_2N(CH_3)_3^+$, 1,2-dipalmitoyl-sn-glycero-3-phosphocholine, wherein $R_1$ and $R_2$ are each $-(CH_2)_{14}CH_3$ and X is $-CH_2CH_2N(CH_3)_3^+$, 1,2-distearoyl-sn-glycero-3-phosphocholine, wherein $R_1$ and $R_2$ are each $-(CH_2)_{16}CH_3$ and X is $-CH_2CH_2N(CH_3)_3^+$, 1,2-dimyristoyl-sn-glycero-3-phosphoethanolamine, wherein $R_1$ and $R_2$ are each $-(CH_2)_{12}CH_3$ and X is $-CH_2CH_2NH_3^+$, 1,2-dipalmitoyl-sn-glycero-3-phosphoethanolamine, wherein $R_1$ and $R_2$ are each $-(CH_2)_{14}CH_3$ and X is $-CH_2CH_2NH_3^+$, 1,2-distearoyl-sn-glycero-3-phosphoethanolamine, wherein $R_1$ and $R_2$ are each $-(CH_2)_{16}CH_3$ and X is $-CH_2CH_2NH_3^+$, 1,2-dimyristoyl-sn-glycero-3-phosphoglycerol, wherein $R_1$ and $R_2$ are each $-(CH_2)_{12}CH_3$ and X is $-CH_2CH(OH)$ $CH_2OH$, 1,2-dipalmitoyl-sn-glycero-3-phosphoglycerol, wherein $R_1$ and $R_2$ are each $-(CH_2)_{14}CH_3$ and X is $-CH_2CH(OH)CH_2OH$, 1,2-distearoyl-sn-glycero-3-phosphoglycerol, wherein $R_1$ and $R_2$ are each $-(CH_2)_{16}CH_3$ and X is $-CH_2CH(OH)CH_2OH$, 1,2-dimyristoyl-sn-glycero-3-phosphatidic acid, wherein $R_1$ and $R_2$ are each $-(CH_2)_{12}CH_3$ and X is $-H$, 1,2-dipalmitoyl-sn-glycero-3-phosphatidic acid, wherein $R_1$ and $R_2$ are each $-(CH_2)_{14}CH_3$ and X is $-H$, 1,2-distearoyl-sn-glycero-3-phosphatidic acid, wherein $R_1$ and $R_2$ are each $-(CH_2)_{16}CH_3$ and X is $-H$, all available from Sygena, Inc., Cambridge, Mass., and the like. Phospholipids are also available from, for example, Avanti Polar Lipids, Inc., Alabaster, Ala., and available as PRO-LIPO from Lucas Meyer, Paris, France. The PRO-LIPO materials are available in a form such that addition of water to the commercially provided mixture leads to the spontaneous formation of liposomes; these materials are mixtures of lipids with the main component being hydrogenated phosphatidylcholine (soya based), and contain a small amount of negatively charged lipids to facilitate the formation of stable bilayers.

Also suitable are diacylgyceroles, of the general formula wherein $R_1$ and $R_2$ generally are hydrocarbon groups, either saturated or unsaturated, preferably with from about 10 to about 18 carbon atoms, although the number of carbon atoms can be outside this range. Specific examples of diacylglyceroles include 1,2-dimyristoyl-sn-glycerol, wherein $R_1$ and $R_2$ are each $-(CH_2)_{12}CH_3$, 1,2-dipalmitoyl-sn-glycerol, wherein $R_1$ and $R_2$ are each $-(CH_2)_{14}CH_3$, 1,2-distearoyl-sn-glycerol, wherein $R_1$ and $R_2$ are each $-(CH_2)_{16}CH_3$, all available from Sygena, Inc., Cambridge, Mass., and the like.

Also suitable are α,ω-dipolar diacetyles of the general formula wherein x and y are each integers of from about 6 to about 10, and preferably from about 8 to about 9, and $R_1$ and $R_2$ are each $-COOH$, $-CH_2OH$, or $-CH_2OPO_3H_2$, prepared as disclosed in, for example, H. Bader and H. Ringsdorf, "Liposomes from α,ω-Dipolar Amphiphiles with a Polymerizable Diyne Moiety in the Hydrophobic Chain," *Journal of Polymer Science: Polymer Chemistry Edition*, vol. 20, p. 1623 (1982), the disclosure of which is totally incorporated herein by reference.

Cholesterol can be employed to improve the stability of liposomes if desired by including it in the solution containing the liposomes. Examples of mixtures include (but are not limited to) (a) mixtures of phosphatidyl choline (0.63 parts by weight), phosphatidic acid (0.14 parts by weight), and cholesterol (0.39 parts by weight) in water (10 parts by weight), wherein the particles typically exhibit an average diameter of about 100 nanometers; (b) mixtures of cholesterol (2.5 parts by weight), 1,2-dimyristoyl-sn-glycero-3-phosphoglycerol (2.5 parts by weight) in various solvents, such as (i) water (100 parts by weight), (ii) mixtures of water (95 parts by weight) and sulfolane (5 parts by weight), (iii) mixtures of water (95 parts by weight) and ethylene glycol (5 parts by weight), (iv) mixtures of water (93 parts by weight, and butyl carbitol (7 parts by weight), (v) mixtures of water (86 parts by weight), sulfolane (5 parts by weight), and butyl carbitol (9 parts by weight), (vi) mixtures of water (95 parts by weight), sulfolane (3 parts by weight), and butyl carbitol (2 parts by weight), and the like; (c) mixtures of cholesterol (2.5 parts by weight), 1,2-dimyristoyl-sn-glycero-3-phosphoglycerol (1.3 parts by weight), and 1,2-dimyristoyl-sn-glycero-3-phosphoethanolamine (1.3 parts by weight) in various solvents, such as (i) water (100 parts by weight), (ii) mixtures of water (95 parts by weight) and sulfolane (5 parts by weight), (iii) mixtures of water (95 parts by weight) and ethylene glycol (5 parts by weight), (iv) mixtures of water (93 parts by weight) and butyl carbitol (7 parts by weight), (v) mixtures of water (86 parts by weight), sulfolane (5 parts by weight), and butyl carbitol (9 parts by weight), (vi) mixtures of water (95 parts by weight), sulfolane (3 parts by weight), and butyl carbitol (2 parts by weight), and the like; (d) mixtures of cholesterol (3.5 parts by weight) and 1,2-dimyristoyl-sn-glycero-3-phosphoglycerol (1.5 parts by weight) in various solvents, such as (i) water (95 parts by weight), (ii) mixtures of water (95 parts by weight) and sulfolane (5 parts by weight), (iii) mixtures of water (95 parts by weight) and ethylene glycol (5 parts by weight), (iv) mixtures of water (95 parts by weight) and butyl carbitol (5 parts by weight), (v) mixtures of water (86 parts by weight), sulfolane (5 parts by weight), and butyl carbitol (9 parts by weight), (vi) mixtures of water (95 parts by weight), sulfolane (3 parts by weight), and butyl carbitol (2 parts by weight), and the like; (e) mixtures of cholesterol (3.5 parts by weight), 1,2-dimyristoyl-sn-glycero-3-phosphoglycerol (0.5 parts by weight), and 1,2-dimyristoyl-sn-glycero-3-phosphoethanolamine (1.0 part by weight) in various solvents, such as (i) water (95 parts by weight), (ii) mixtures of water (95 parts by weight) and sulfolane (5 parts by weight), (iii) mixtures of water (95 parts by weight) and ethylene glycol (5 parts by weight), (iv) mixtures of water (95 parts by weight) and butyl carbitol (5 parts by weight), (v) mixtures of water (86 parts by weight), sulfolane (5 parts by weight), and butyl carbitol (9 parts by weight), (vi) mixtures of water (95 parts by weight), sulfolane (3 parts by weight), and butyl carbitol (2 parts by weight), and the like; and any other desired mixture.

The vesicle-forming lipid is present in the ink in any effective amount. Typically, the vesicle-forming lipid is present in the ink in an amount of from about 0.5 to about 20 percent by weight, and preferably from about 1 to about 10 percent by weight, although the amount can be outside these ranges.

Liposomes of the vesicle-forming lipid can be prepared by any desired or suitable method, such as by admixing the lipid and an aqueous vehicle (either pure water or a mixture of water and other components) by mechanical dispersion, micro-emulsification, sonication, membrane extrusion, microfluidization, or the like. For example, a microfluidizer is a machine which pumps fluid at high pressures (up to about 12,000 pounds per square inch) along precisely defined mocrochannels and which divides the fluid into two streams and causes them to collide together at right angles at high velocity. This impingement is arranged so that nearly all of the energy supplied to the system (turbulence and cavitation) remains within the small area of liposome formation, resulting in the production of liposomes of relatively small size and relative uniformity. The lipids can be introduced into the fluidizer either as a suspension of large multi-lamellar vesicles or as a slurry of unhydrated lipid in an aqueous medium. The fluid collected can be recycled through the pump and the interaction chamber until vesicles of the desired dimensions are obtained.

The vesicles in the ink preferably have an average particle diameter less than about 700 nanometers and usually are preferred to be less than about 200 nanometers in average particle diameter. For black inks, particle diameters of up to about 500 nanometers may be suitable, although colored inks exhibit less clarity at these particle sizes than do inks with smaller liposomes. Particle size of the vesicles can be adjusted by several methods, such as by the choice of starting materials and substituents thereon, chain length of the hydrophobic portion(s) thereof, etc., by filtration through a controlled pore size, by microfluidization, wherein the particles are impinged on one another, by high shear mechanical mixing, by the identity and concentration of the other ink ingredients, and the like. The other ink ingredients may affect the size and stability of the liposomes. For example, a vesicle-forming lipid may, when admixed with pure water, form liposomes of about 50 nanometers in diameter, but when other ingredients, such as the organic cosolvents and humectants commonly employed in thermal ink jet inks, are added to the composition, the liposomes may swell to diameters of about 100 nanometers because the organic material, which is relatively less polar than water, may have a tendency to push apart the "tails" in the interior or the liposome bilayer membrane, thereby thickening the membrane and possibly rendering it less stable.

The stability of the liposome structures can, if desired, be enhanced. One method of stabilization entails steric stabilization of the liposomes by preparing lipid derivatives of polyalkyl ethers such as polyethylene glycol and incorporating them into the bilayer structure of the liposome membrane. For example, the Stealth Lipid, available from Liposome Technology Incorporated, consists of a polyethylene glycol polymer covalently bonded to a lipid molecule. The presence of the polyethylene glycol sterically stabilizes the liposome by increasing the distance between adjacent bilayers of a multi-membrane liposome without modifying the basic bilayer structure. These materials and processes are disclosed in, for example, U.S. Pat. No. 5,013,556 (Woodle et al.), the disclosure of which is totally incorporated herein by reference. Another method of stabilization entails polymerization of the lipid molecules within the liposome membrane. The molecules within the membrane become bonded to each other to varying degrees. The polymerization stabilizes the liposome membrane, and when, for example, an ink cosolvent or humectant is present, the liposomes may swell but will not rupture. Polymerization is generally carried out by selecting the monomeric lipid to have one or more polymerizable groups, such as an unsaturated group or the like, and effecting polymerization subsequent to vesicle formation by any desired method, such as by application of heat, ultraviolet light, or the like. If desired, a polymerization initiator can be employed. Polymerization of the lipid molecules within liposome membranes is disclosed in, for example, H. Bader and H. Ringsdoff, "Liposomes From α,ω-Dipolar Amphiphiles with a Polymerizable Diyne Moiety in the Hydrophobic Chain," *Journal of Polymer Science: Polymer Chemistry Edition*, vol. 20, p. 1623 (1982); D. F. O'Brien et al., "Preparation and Characterization of Polymerized Liposomes," *Annals New York Academy of Sciences*, vol. 446, P. 282 (1985); P. Tundo et al., "Functionally Polymerized Surfactant Vesicles; Synthesis and Characterization," *J. Am. Chem. Soc.*, vol. 104, p. 456 (1982); K. Kurihara and J. Fendler, "Stabilization of Small Unilamellar Liposomes: Polymerization of Surfactants in Phospholipid Vesicles," *J. Chem. Soc., Chem. Commun.*, vol. 21, p. 1188 (1983); H. Ringsdoff and B. Schlarb, "Liposomes in a Net from Lipids with Ionically or Covalently Bound Polymerizable Headgroups," *Polym. Prepr. (Am. Chem. Soc., Div. Polym. Chem.)*, vol. 27, no. 2, p. 195 (1985); E. Hasegawa et al., "Synthesis of Novel Styrene Groups Containing Glycerophosphocholines and their Polymerization as Liposomes," *Makromol. Chem., Rapid Commun.*, vol. 5, p. 779 (1984); E. Hasegawa et al., "Synthesis of Polymerizable Glycerophosphocholines and their Polymerized Vesicles," *Polymer Bulletin*, vol. 14, p. 31 (1985); P. Tyminski and I. Ponticello, "Polymerizable Dienoyl Lipids as Spectroscopic Bilayer Membrane Probes," *J. Am. Chem. Soc.*, vol. 109, p. 6541 (1987); H. Ohno et al., "Gamma-Ray Polymerization of Phospholipids Having Diene or Triene Groups as Liposomes," *Journal of Polymer Science: Polymer Chemistry Edition*, vol. 24, p. 2959 (1986); and V. Torchilin et al., "Polymerization of Liposome-Encapsulated Hydrophilic Monomers," *Makromol. Chem., Rapid Commun.*, vol. 8, p. 457 (1987); the disclosures of each of which are totally incorporated herein by reference. Alternatively, the liposome membrane can be coated with a polymer net, wherein the polymer is adsorbed onto the vesicle membrane but without any covalent linkage between the vesicle and the polymer, as disclosed in, for example, K. Aliev, *Makromol. Chem., Rapid Commun.*, vol. 5, p. 345 (1984), the disclosure of which is totally incorporated herein by reference.

Inks of the present invention also contain a dye colorant. In some embodiments of the present invention, dye molecules are contained within the central cavities of the liposomes. In other embodiments of the present invention, dye molecules are contained between two or more membrane structures within vesicles having two or more bilayer membranes. In yet other embodiments of the present invention, dye molecules are contained within the vesicle membrane, and are situated between the molecules forming the bilayer membrane. Examples of dyes suitable for these embodiments include alcohol soluble dyes, such as the Orasol series of dyes, including ORASOL Blue 2GLN, available from Ciba Geigy, and the like. If desired, one or more alcohols can be included in the ink to enhance the solubility of the alcohol soluble dye. Oil soluble dyes can also be employed and can be encapsulated within the liposomic structures. In thermal ink jet printing applications, oil soluble dyes may be less preferred because of possible kogation on heaters of the printheads, but they may also be employed in these embodiments. In some embodiments, oil soluble dyes are trapped within the membrane and not within the internal cavity of the liposome. Water soluble dyes can also be employed in these embodiments. Inks containing water or alcohol soluble dyes can be prepared by preparing a concentrate of the lipid molecules with the dye in water. The concentrate is then diluted with water while agitating with a high speed stirrer or polytron to yield encapsulated materials. In another embodiment, all ink ingredients are mixed in water followed by microfluidizing the mixture for periods of, for example, from about 1 to about 10 minutes at, for example, from about 5,000 to about 30,000 pounds per square inch. Microfluidization may be preferred for higher yields of encapsulation and better control of the liposome size and size distribution.

In still other embodiments of the present invention, dyes are selected to have an ionic attraction to the liposomes. For example, anionic dyes can be employed well with liposomes having cationic moieties on the surface structures thereof. The dye molecules can be ionically associated with the liposome either on the inner surface of the vesicle, or on the outer surface of the vesicle, or on both the inner and outer surfaces of the vesicle. Cationic or anionic dyes may be employed. Examples of suitable dyes include (but are not limited to) Bernacid Red 2BMN, Pontamine Brilliant Bond Blue A, BASF X-34, Pontamine, Food Black 2, Carodirect Turquoise FBL Supra Conc. (Direct Blue 199), available from Carolina Color and Chemical, Special Fast Turquoise 8GL Liquid (Direct Blue 86), available from Mobay Chemical, Intrabond Liquid Turquoise GLL (Direct Blue 86), available from Crompton and Knowles, Cibracron Brilliant Red 38-A (Reactive Red 4), available from Aldrich Chemical, Drimarene Brilliant Red X-2B (Reactive Red 56), available from Pylam, Inc., Levafix Brilliant Red E-4B, available from Mobay Chemical, Levafix Brilliant Recl E-6BA, available from Mobay Chemical, Procion Red H8B (Reactive Red 31), available from ICI America, Pylam Certified D&C Red #28 (Acid Red 92), available from Pylam, Direct Brill Pink B Ground Crude, available from Crompton & Knowles, Cartasol Yellow GTF Presscake, available from Sandoz, Inc., Tartrazine Extra Conc. (FD&C Yellow #5, Acid Yellow 23), available from Sandoz, Carodirect Yellow RL (Direct Yellow 86), available from Carolina Color and Chemical, Cartasol Yellow GTF Liquid Special 110, available from Sandoz, Inc., D&C Yellow #10 (Acid Yellow 3), available from Tricon, Yellow Shade 16948, available from Tricon, Basacid Black X34, available from BASF, Carta Black 2GT, available from Sandoz, Inc., Neozapon Red 492 (BASF), Oresol Red G (Ciba-Geigy), Direct Brilliant Pink B (Crompton-Knolls), Aizen Spilon Red C-BH (Hodagaya Chemical Company), Kayanol Red 3BL (Nippon Kayaku Company), Levanol Brilliant Red 3BW (Mobay Chemical Company), Levaderm Lemon Yellow (Mobay Chemical Company), Spirit Fast Yellow 3G, Aizen Spilon Yellow C-GNH (Hodagaya Chemical Company), Sirius Supra Yellow GD 167, Cartesol Brilliant Yellow 4GF (Sandoz), Pergasol Yellow CGP (Ciba-Geigy), Orasol Black RL (Ciba-Geigy), Oresol Black RLP (Ciba-Geigy), Savinyl Black RLS (Sandoz), Dermacarbon 2GT (Sandoz), Pyrazol Black BG (ICI), Morfast Black Conc A (Morton-Thiokol), Diazol Black RN Quad (ICI), Orasol Blue GN (Ciba-Geigy), Savinyl Blue GLS (Sandoz), Luxol Blue MBSN (Morton-Thiokol), Sevron Blue 5GMF (ICI), Basacid Blue 750 (BASF), Levafix Brilliant Yellow E-GA, Levafix Yellow E2RA, Levafix Black EB, Levafix Black E-2G, Levafix Black P-36A, Levafix Black PN-L, Levafix Brilliant Red E6BA, and Levafix Brilliant Blue EFFA, available from Bayer, Procion Turquoise PA, Procion Turquoise HA, Procion Turquoise Ho5G, Procion Turquoise H-7G, Procion Red MX-5B, Procion Red MX 8B GNS, Procion Red G, Procion Yellow MX-8G, Procion Black H-EXL, Procion Black P-N, Procion Blue MX-R, Procion Blue MX-4GD, Procion Blue MX-G, and Procion Blue MX-2GN, available from ICI, Cibacron Red F-B, Cibacron Black BG, Lanasol Black B, Lanasol Red 5B, Lanasol Red B, and Lanasol Yellow 46, available from Ciba-Geigy, Baslien Black P-BR, Baslien Yellow EG, Baslien Brilliant Yellow P-3GN, Baslien Yellow M-6GD, Baslien Brilliant Red P-3B, Baslien Scarlet E-2G, Baslien Red E-B, Baslien Red E-7B, Baslien Red M-5B, Baslien Blue E-R, Baslien Brilliant Blue P-3R, Baslien Black P-BR, Baslien Turquoise Blue P-GR, Baslien Turquoise M-2G, Baslien Turquoise E-G, and Baslien Green E- 6B, available from BASF, Sumifix Turquoise Blue G, Sumifix Turquoise Blue H-GF, Sumifix Black B, Sumifix Black H-BG, Sumifix Yellow 2GC, Sumifix Supra Scarlet 2GF, and Sumifix Brilliant Recl 5BF, available from Sumitomo Chemical Company, Intracron Yellow C-8G, Intracron Red C-8B, Intracron Turquoise Blue GE, Intracron Turquoise HA, and Intracron Black RL, available from Crompton and Knowles, Dyes and Chemicals Division, and the like. Particularly preferred are BASF X-34 black dye (available from BASF) and Duasyn Brilliant Red F3B SF VP 218 (high purity solid, obtained from Hoechst, Coventry, R.I.). Dyes that are invisible to the naked eye but detectable when exposed to radiation outside the visible wavelength range (such as ultraviolet or infrared radiation), such as dansyl-lysine, N-(2-aminoethyl)-4-amino-3,6odisulfo-1,8-dinaphthalimide dipotassium salt, N-(2-aminopentyl)-4-amino-3,6-disulfo-1,8-dinaphthalimide dipotassium salt, Cascade Blue ethylenediamine trisodium salt (available from Molecular Proes, Inc.), Cascade Blue cadaverine trisodium salt (available from Molecular Proes, Inc.), bisdiazinyl derivatives of 4,4'-diaminostilbene-2,2'-disulfonic acid, amide derivatives of 4,4'-diaminostilbene-2,2'-disulfonic acid, phenylurea derivatives of 4,4'-disubstituted stilbene-2,2'-disulfonic acid, mono- or di-naphthyltriazole derivatives of 4,4'-disubstituted stilbene disulfonic acid, derivatives of benzithiazole, derivatives of benzoxazole, derivatives of benziminazole, derivatives of coumarin, derivatives of pyrazolines containing sulfonic acid groups, 4,4'-bis(triazin-2-ylamino)otriazoles, 2-(4-phenylstilben-4-yl)benzoxazoles, 4,4-bis(triazo-2-yl) stilbene-2,2'-disulfonic acids, 1,4-bis(styryl)biphenyls, 1,3-diphenyl-2-pyrazolines, bis(benzazol-2-yl) derivatives, 3-phenyl-7-(triazin-2-yl)coumarins, carbostyrils, naphthalimides, 3,7-diaminodibenzothiophen-2,8-disulfonic acid-5,5-dioxide, other commercially available materials, such as C.I. Fluorescent Brightener No. 28 (C.I. 40622), the fluorescent series Leucophor B-302, BMB (C.I. 290), BCR, BS, and the like (available from Leucophor), and the like, are also suitable. A mixture of dyes in the proportions desired to obtain a specific shade may also be employed.

In other embodiments of the present invention, dye molecules are covalently bonded to the liposomes. The dye molecules can be covalently bonded to the liposome either on the inner surface of the vesicle, or on the outer surface of the vesicle, or on both the inner and outer surfaces of the vesicle. The lipid molecule is selected to have at least one functional group on either the polar "head" of the molecule or the nonpolar "tail" of the molecule which is capable of reacting with a dye molecule to form a covalent bond. Suitable functional groups on the lipid molecule include —OH, —NH$_2$, and the like. Dyes suitable for this embodiment of the present invention generally include any of the Reactive Dyes capable of reacting with the reactive group on the lipid to become attached thereto. These dyes typically comprise a chromophore soluble in water, such as an anthraquinone, a monoazo dye, a disazo dye, a phthalocyanine, an aza[18]annulene, a formazan copper complex, a triphenodioxazine, and the like, to which is covalently attached a reactive group, such as a dichlorotriazine, a monochlorotriazine, a dichloroquinoxaline, an aminoepoxide, a mono-(m-carboxypyridinium)triazine, a 2,4,5-trihalogenopyrimidine, a 2,4-dichloropyrimidine, a 2,3-dichloroquinoxaline, a monofluorotriazine, a 4,5-dichloro-6-methyl-2-methylsulfonylpyrimidine, a 1,4-dichlorophthalazine, a chlorobenzothiazole, a sulfatoethylsulfone, a β-chloroethylsulfone, a 4,5-dichloro-6-pyridazone, an α-bromoacryloylamido, an α,β-dibromopropionylamido, and the like. Examples of suitable dyes include Levafix Brilliant Yellow E-GA, Levafix Yellow E2RA, Levafix Black EB, Levafix Black E-2G, Levafix Black P-36A, Levafix Black PN-L, Levafix Brilliant Red E6BA, and Levafix Brilliant Blue EFFA, available from Bayer, Procion Turquoise PA, Procion Turquoise HA, Procion Turquoise H-5G, Procion Turquoise H-7G, Procion Red MX-5B, Procion Red MX 8B GNS, Procion Red G, Procion Yellow MX-8G, Procion Black H-EXL, Procion Black P-N, Procion Blue MX-R, Procion Blue MX-4GD, Procion Blue MX-G, and Procion Blue MX-2GN, available from ICI, Cibacron Red F-B, Cibacron Black BG, Lanasol Black B, Lanasol Red 5B, Lanasol Red B, and Lanasol Yellow 4G, available from Ciba-Geigy, Basilen Black P-BR, Basilen Yellow EG, Basilen Brilliant Yellow P-3GN, Basilen Yellow M-6GD, Basilen Brilliant Red P-3B, Basilen Scarlet E-2G, Basilen Red E-B, Basilen Red E-7B, Basilen Red M-5B, Basilen Blue E-R, Basilen Brilliant Blue P-3R, Basilen Black P-BR, Basilen Turquoise Blue P-GR, Basilen Turquoise M-2G, Basilen Turquoise E-G, ,and Basilen Green E-6B, available from BASF, Sumifix Turquoise Blue G, Sumifix Turquoise Blue H-GF, Sumifix Black B, Sumifix Black H-BG, Sumifix Yellow 2GC, Sumifix Supra Scarlet 2GF, and Sumifix Brilliant Red 5BF, available from Sumitomo Chemical Company, Intracron Yellow C-8G, Intracron Red C-8B, Intracron Turquoise Blue GE, Intracron Turquoise HA, and Intracron Black RL, available from Crompton and Knowles, Dyes and Chemicals Division, Duasyn Black RL-SF VP 228 (Reactive Black 31), and the like. Additional examples of suitable reactive groups and reactive dyes are disclosed in, for example, U.S. Pat. No. 5,378,574, U.S. Pat. No. 4,664,708, U.S. Pat. No. 5,275,647, U.S. Pat. No. 5,250,121, U.S. Pat. No. 5,230,733, U.S. Pat. No. 5,118,350, U.S. Pat. No. 5,006,862, U.S. Pat. No. 4,908,062, U.S. Pat. No. 5,403,358, U.S. Pat. No. 5,358,558, U.S. Pat. No. 5,364,702, and U.S. Pat. No. 5,098,475, the disclosures of each of which are totally incorporated herein by reference.

In a specific embodiment of the present invention, the dye is selected so that the colorants comprising phospholipids covalently bound to dyes are detectable when exposed to radiation outside the visible wavelength range. In another specific embodiment of the present invention, the dye is selected so that the colorants comprising phospholipids covalently bound to dyes are substantially colorless and detectable when exposed to radiation outside the visible wavelength range. For example, fluorescent or infrared-sensitive dyes can be used provided that they exhibit sufficient solubility in water to undergo the reaction with the phospholipids, they absorb light in a wavelength range other than the visible, such as infrared or ultraviolet, they emit light that is detectable by human eyes or that matches that of a suitable detector when exposed to a spectral range outside of the visible wavelength range, and they exhibit good thermal stability and light stability. In addition, in another specific embodiment of the present invention, the ink contains both a colorant visible to the human eye under normal conditions, such as a pigment, a dye, or phospholipids wherein the covalently attached dye exhibits color in the visible wavelength range, and phospholipids wherein the covalently attached dye is detectable when exposed to radiation outside the visible wavelength range. In this embodiment, the covalently attached dye can be either colored or substantially colorless. In the instance of substantially colorless dyes, suitable dyes or chromophores are distinguishable from the visible colorant in the ink under the conditions for viewing or detecting the ink containing substantially colorless particles. Examples of suitable fluorescent chromophores include dansyl-lysine, N-(2-aminoethyl)-4-amino-3,6-disulfo-1,8-dinaphthalimide dipotassium salt, N-(2-aminopentyl)-4-amino-3,6-disulfo-1,8-dinaphthalimide dipotassium salt, Cascade Blue ethylenediamine trisodium salt (available from Molecular Proes, Inc.), Cascade Blue cadaverine trisodium salt (available from Molecular Proes, Inc.), bisdiazinyl derivatives of 4,4'-diaminostilbene-2,2'-disulfonic acid of the formula wherein R is an aromatic amine, an aliphatic amine, a hydroxyl group, an alkoxy group, an aryloxy group, a halogen atom, an aminoalcohol group, a sulfonated aromatic amine, or the like, R' is an aromatic amine, an aliphatic amine, a hydroxy group, an alkoxy group, an aryloxy group, a halogen atom, an aminoalcohol group, a sulfonated aromatic amine, or the like, M is hydrogen, a lithium ion, a sodium ion, a potassium ion, a cesium ion, a rubidium ion, an ammonium ion, or the like, and wherein the ratio of sulfonic acid functional group to stilbene moiety typically varies from about 1:1 to about 6:1, although the ratio can be outside of this range; unsymmetrical triazinyl derivatives of 4,4'-diaminostilbene-2,2'-disulfonic acid; amide derivatives of 4,4'-diaminostilbene-2,2'-disulfonic acid of the formula wherein R is alkoxy, alkyl, phenyl, hydrogen, acetyl, alkylamido, and the like, R' is hydrogen, alkyl, alkoxy, phenyl, acetyl, alkylamido, and the like, M is hydrogen, a lithium ion, a sodium ion, a potassium ion, a cesium ion, a rubidium ion, an ammonium ion, or the like, and wherein the ratio of sulfonic acid group to aminostilbene typically is from about 2:1 to about 4:1, although the ratio can be outside of this range; phenylurea derivatives of 4,4'-disubstituted stilbene-2,2'-disulfonic acid of the formula wherein R is alkoxy, alkyl, phenyl, hydrogen, acetyl, alkylamido, and the like, R' is hydrogen, alkyl, alkoxy, phenyl, acetyl, alkylamido, and the like, M is hydrogen, a lithium ion, a sodium ion, a potassium ion, a cesium ion, a rubidium ion, an ammonium ion, or the like, and the ratio of sulfonic acid group to aminostilbene typically is from about 2:1 to about 4:1, although the ratio can be outside of this range; mono- or di-naphthyltriazole derivatives of 4,4'-disubstituted stilbene disulfonic acid of the formula wherein R is hydrogen or SO₃R', wherein R' is hydrogen, a lithium ion, a sodium ion, a potassium ion, a cesium ion, a rubidium ion, an ammonium ion, or the like, and wherein the ratio of sulfonic acid group to aminostilbene is typically from about 2:1 to about 4:1, although the ratio can be outside of this range; derivatives of benzithiazole; derivatives of benzoxazole; derivatives of benziminazole; derivatives of coumarin; derivatives of pyrazolines containing sulfonic acid groups; 4,4'-bis(triazin-2-ylamino)stilbene-2,2'-disulfonic acids; 2-(stilben-4-yl)naphthotriazoles; 2-(4-phenylstilben-4-yl)benzoxazoles; 4,4-bis(triazo-2-yl) stilbene-2,2'-disulfonic acids; 1,4-bis(styryl)biphenyls; 1,3-diphenyl-2-pyrazolines; bis(benzazol-2-yl) derivatives, 3-phenyl-7-(triazin-2-yl)coumarins; carbostyrils; naphthalimides; 3,7-diaminodibenzothiophen-2,8-disulfonic acid-5, 5-dioxide; other commercially available materials, such as C.I. Fluorescent Brightener No. 28 (C.I. 40622), the fluorescent series Leucophor B-302, BMB (C.I. 290), BCR, BS, and the like (available from Leucophor); fluorescent brighteners as shown in the Colour Index, volume 2, 3rd edition, (society of Dyers and Colourists); and the like. Additional examples of suitable chromophores that absorb in the infrared region include commercially available materials such as the Pro-Jet IR series of materials, available from ICI Fine Chemicals Division, as well as other infrared absorbing materials available from, for example, Eastman Kodak Company, Rochester, N.Y. and Lambda Physics Inc., Bedford, Mass.

Also suitable are the following infrared-sensitive dye structures:

17 wherein R can be any of the following groups:

—SO₂CH₂CH₂OSO₃Na

18

-continued

—CH₂CH₂—[triazine with Cl, NH-phenyl-SO₃Na]

Most of the dyes with these structures are colored and thus are best suited for inks wherein the dyed vesicles are both visibly colored and detectable when exposed to radiation outside the visible wavelength range.

A typical reaction scheme, for a liposome containing hydroxyl groups and Reactive Black 31 dye, is as follows:

To prepare the liposomes having dyes covalently attached thereto, the liposomes and the dye molecules are admixed in any desired or suitable relative amounts, typically in a ratio of dye:liposome of from about 1:1 to about 20:1, and preferably in a ratio of dye:liposome of about 5:1, although the relative amounts can be outside these ranges, typically in aqueous solution, at an alkaline pH (preferably from about 8 to about 12, although the pH can be outside this range), preferably with heating, typically to temperatures of from about 50° to about 95° C. (although the temperature can be outside this range), and typically for periods of from about 5 to about 120 minutes (although the time can be outside this range).

The resulting mixture typically contains colorants wherein a dye is covalently bound to the outside surface of liposomes, or to both surfaces. These colorants enable better control of the long term stability of the inks. The core of the liposome is left free to complex as large an amount of water as possible, enabling advantages such as reduced intercolor bleeding and the like, as well as lower density and increased long term stability of the particles.

Within the ink compositions of the present invention, the dye is present in any effective amount to achieve the desired degree of coloration. Typically, the dye is present in the ink in an amount of from about 0.1 to about 10 percent by weight, and preferably from about 1 to about 8 percent by weight, although the amount can be outside these ranges.

Other additives can also be present in the inks. For example, one or more dispersing agents or surfactants or wetting agents may be added to the ink. These additives can be of the cationic, anionic, or nonionic types. Suitable surfactants, dispersing agents, and wetting agents include copolymers of naphthalene sulfonic acid salt and formaldehyde, including Daxad® 11, 11KLS, 19, 19K, and the like available from W. R. Grace & Company, the Lomar® D series available from Diamond Shamrock Corporation, vinyl aromatic salts available from Polyscience Company, Tamol® SN, Tamol® LG, the Triton® series available from Rohm and Haas Company, the Igepal® series available from GAF Company, the Tergitol® series, water compatible solvents such as ethylene glycol and the like, and other commercially available surfactants. These surfactants, dispersing agents, and wetting agents, if present, are present in any effective or desired amount, typically from about 0.01 to about 10 percent by weight of the ink, and preferably from about 0.01 to about 3 percent by weight of the ink, although the amount can be outside these ranges.

One example of an additive to the inks is a polymeric additive consisting of two polyalkylene oxide chains bound to a central bisphenol-A-type moiety. This additive is of the formula wherein $R^1$ and $R^2$ are independently selected from the group consisting of hydrogen, alkyl groups with from 1 to about 8 carbon atoms, such as methyl, ethyl, propyl, and the like, and alkoxy groups with from 1 to about 8 carbon atoms, such as methoxy, ethoxy, butoxy, and the like, $R^3$ and $R^4$ are independently selected from the group consisting of alkyl groups with from 1 to about 4 carbon atoms, and x and y are each independently a number of from about 100 to about 400, and preferably from about 100 to about 200. Generally, the molecular weight of the polyalkylene oxide polymer is from about 14,000 to about 22,000, and preferably from about 15,000 to about 20,000, although the molecular weight can be outside this range. Materials of this formula are commercially available; for example, Carbowax M20, a polyethylene oxide/bisphenol-A polymer of the above formula with a molecular weight of about 18,000, available from Union Carbide Corporation, Danbury, Conn., is a suitable polymeric additive for the inks of the present invention. In addition, compounds of the above formula can be prepared by the methods disclosed in *Polyethers*, N. G. Gaylord, John Wiley & Sons, New York (1963) and "Laboratory Synthesis of Polyethylene Glycol Derivatives," J. M. Harris, *J. Molecular Science—Rev. Macromol. Chem. Phys.*, C25(3), 325–373 (1985), the disclosures of each of which are totally incorporated herein by reference. The polyalkylene oxide additive is generally present in the ink in an amount of at least about 1 part per million. Typically, the polyalkylene oxide additive is present in amounts of up to 1 percent by weight of the ink, and preferably in amounts of up to 0.5 percent by weight of the ink; larger amounts of the additive may increase the viscosity of the ink beyond the desired level, but larger amounts can be used in applications wherein increased ink viscosity is not a problem. Inks containing these additives are disclosed in U.S. Pat. No. 5,207,825, the disclosure of which is totally incorporated herein by reference.

Other optional additives to the ink composition of the present invention include biocides, such as Dowicil 150, 200, and 75, benzoate salts, sorbate salts, and the like, typically present in an amount of from about 0.0001 to about 4 percent by weight, and preferably from about 0.01 to about 2.0 percent by weight, although the amount can be outside these ranges, humectants, such as ethylene glycol, diethylene glycol, propylene glycol, N-methylpyrrolidinone, hydroxyethers, ethers, amides, cyclic amides, sulfones, sulfoxides, ketones, lactones, esters, alcohols, and the like, typically present in an amount of from 0 to about 70 percent by weight, and preferably from about 3 to about 40 percent by weight, although the amount can be outside these ranges, antioxidants, including derivatives of phenols such as BHT, 2,6-di-t-butylphenol, and the like, tocopherol derivatives such as Vitamin E and the like, aromatic amines, alkyl and aromatic sulfides, and the like, typically present in an amount of from 0 to about 10 percent by weight, and preferably from 0 to about 5 percent by weight, although the amount can be outside these ranges, pH controlling agents, including acids such as acetic acid, phosphoric acid, boric acid, sulfuric acid, nitric acid, hydrochloric acid, and the like, bases such as potassium hydroxide, sodium hydroxide, lithium hydroxide, ammonium hydroxide, trimethylamine, ethanolamine, morpholine, triethanolamine, diethanolamine, and the like, phosphate salts, carboxylate salts, sulfite salts, amine salts, and the like, typically present in an amount of from 0 to about 10 percent by weight, and preferably from about 0.001 to about 5 percent by weight, although the amount can be outside these ranges, drying accelerating agents, such as sodium lauryl sulfate, N,N-diethyl-m-toluamide, cyclohexylpyrrolidinone, butylcarbitol, and the like, typically present in an amount of from about 0.001 to about 5 percent by weight, and preferably from about 0.01 to about 3 percent by weight, although the amount can be outside these ranges, surface tension modifiers, such as sodium lauryl sulfate, sodium octyl sulfate, and the like, typically present in an amount of from 0 to about 10 percent by weight, and preferably from 0 to about 5 percent by weight, although the amount can be outside these ranges, ink penetrants, such as alcohols, sodium lauryl sulfate, esters, ketones, and the like, typically present in an amount of from about 0.001 to about 15 percent by weight, and preferably from about 0.001 to about 10 percent by weight, although the amount can be outside these ranges, and additives for improving waterfastness and lightfastness, such as polyethyleneimine, ethylene and propylene oxide modified polyethyleneimine, and the like, typically present in an amount of from 0 to about 10 percent by weight, and preferably from 0 to about 5 percent by weight, although the amount can be outside these ranges. The viscosity of the ink composition typically is from about 1 to about 10 centipoise (measured at 25° C.) and preferably is less than about 3 centipoise, although the viscosity can be outside these ranges.

Inks of the present invention can be prepared by any process suitable for preparing aqueous-based inks. For example, the ink ingredients, including the prepared liposomes, can be mixed in the desired amounts and stirred until a uniform ink composition results (typically about 30 minutes, although the mixing/stirring time can be either greater or less than this period). While not required, the ink ingredients can be heated during mixing if desired. Subsequent to mixing and stirring, the pH of the ink can be adjusted if desired or necessary. Finally, the ink composition generally is filtered to remove any solid or particulate matter, preferably removing any particles greater than about 2 microns in average particle diameter. Some liposome-based inks may not be suitable for filtration processes, and in these instances large particles can be removed via centrifugation.

Printed images may be generated with the inks of the present invention by incorporating the inks into a thermal ink jet printer and causing droplets of the ink to be ejected in imagewise pattern onto a substrate such as paper or transparency material. Suitable printers for employing the inks of the present invention include commercially available ink jet printers, such as the ThinkJet®, PaintJet®, and DeskJet® printers available from Hewlett-Packard Company. The inks of the present invention are also suitable for use in piezoelectric drop-on-demand ink jet printing systems and in continuous stream ink jet printing systems, including those that have been modified to be capable of heating the ink. Any suitable substrate can be employed, including plain papers such as Xerox® 4024 papers, including Ashdown 4024 DP, Cortland 4024 DP, Champion 4024 DP, Xerox® 4024 D.P. green, Xerox® 4024 D.P. pink, Xerox® 4024 D.P yellow, and the like, Xerox® 4200 papers, Xerox® 10 series paper, canary ruled paper, ruled notebook paper, bond paper such as Gilbert 25 percent cotton bond paper, Gilbert 100 percent cotton bond paper, and Strathmore bond paper, silica coated papers such as Sharp Company silica coated paper, JuJo paper, and the like, transparency materials such as Xerox® 3R3351, Tetronix ink jet transparencies, Arkright ink jet transparencies, and the like, fabrics, textile products, plastics, polymeric films, inorganic substrates such as metals and wood, and the like.

Inks of the present invention are particularly suitable for ink jet printing processes wherein the substrate is heated, a first ink is printed onto the heated substrate, and a second ink is printed onto the heated substrate subsequent to printing with the first ink, wherein a period of at least about 5 seconds occurs between the printing of the first ink and the printing of the second ink. The delay period enables the vehicle of the first ink to evaporate before printing of the second ink, and reduces or prevents intercolor bleed. Inks of the present invention become highly viscous upon evaporation, which enables the printing of images with sharp edges and reduced bleeding in this process.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

An ink composition was prepared as follows. A solution was prepared by dissolving 2 grams of Pro-liposome H (obtained from Lucas Meyer, France) at room temperature with stirring in 34 grams of deionized water and 4 grams of an organic mixture containing 60 percent by volume butyl carbitol and 40 percent by volume glycerol. This solution was heated to 65° C. for 20 minutes, followed by microfluidizing at 8000 psi for 4 minutes. The particle size was then measured over a period of 17 days using a BI-90 Particle Sizer (obtained from Brookhaven Instruments). Observed average particle diameters were as follows:

| Time | Average Diameter (nanometers) |
| --- | --- |
| 0 | 67 |
| 1 hour | 122 |
| 2.5 hours | 133 |
| 5 hours | 158 |
| 29 hours | 228 |
| 48 hours | 247 |
| 78 hours | 271 |
| 7 days | 303 |
| 17 days | 332 |

Subsequently, the solution was made alkaline by adding 2 drops of an aqueous solution containing 1 percent by weight sodium hydroxide, bringing the pH to 10.55. Thereafter, 1 gram of Duasyn Black RL-SF VP-228 (Reactive Black 31) dye was added and the solution was stirred and then heated to 60° C. for 30 minutes, followed by cooling to room temperature. The ink composition thus prepared had a surface tension of about 41 dynes per centimeter and a viscosity of 5.385 centipoise at room temperature. The ink was incorporated into a Hewlett-Packard DeskJet 500 thermal ink jet printer and prints were generated on plain paper. The prints thus formed exhibited an optical density of about 0.95 and were of excellent print quality with sharp edges.

EXAMPLE II

An ink composition was prepared as follows. A solution was prepared by dissolving 2 grams of Pro-liposome H (obtained from Lucas Meyer, France) at room temperature in 2 grams of sulfolane (95.7 percent by weight, balance being water), 3.6 grams of butyl carbitol, and 32.4 grams of deionized water. This solution was heated to 65° C. for 20 minutes, followed by microfluidizing at 8000 psi for 4 minutes. The particle size was then measured over a period of 17 days using a BI-90 Particle Sizer (obtained from Brookhaven Instruments). Observed average particle diameters were as follows:

| Time | Average Diameter (nanometers) |
| --- | --- |
| 0 | 297 |
| 1 hour | 162 |
| 2.5 hours | 182 |
| 5 hours | 195 |
| 29 hours | 274 |
| 48 hours | 303 |
| 78 hours | 356 |
| 7 days | 449 |
| 17 days | 686 |

Subsequently, the solution was made alkaline by adding 2 drops of an aqueous solution containing 1 percent by weight sodium hydroxide, bringing the pH to 10.51. Thereafter, 1 gram of Duasyn Black RL-SF VP-228 (Reactive Black 31) dye was added and the solution was stirred and then heated to 60° C. for 30 minutes, followed by cooling to room temperature. The ink composition thus prepared had a surface tension of about 37 dynes per centimeter and a viscosity of 5.33 centipoise at room temperature. The ink was incorporated into a Hewlett-Packard DeskJet 500 thermal ink jet printer and prints were generated on plain paper. The prints thus formed exhibited an optical density of about 0.9 and exhibited excellent waterfastness and was fast drying, although smearing also occurred.

EXAMPLE III

An ink composition was prepared as follows. A solution was prepared by dissolving 2 grams of Pro-liposome H (obtained from Lucas Meyer, France) at room temperature in 4 grams of glycerol and 34 grams of deionized water. This solution was heated to 65° C. for 20 minutes, followed by microfluidizing at 8000 psi for 4 minutes. The particle size was then measured over a period of 17 days using a BI-90 Particle Sizer (obtained from Brookhaven Instruments). Observed average particle diameters were as follows:

| Time | Average Diameter (nanometers) |
| --- | --- |
| 0 | 32 |
| 1 hour | 37 |
| 2.5 hours | 40 |
| 5 hours | 41 |
| 29 hours | 47 |
| 48 hours | 50 |
| 78 hours | 53 |
| 7 days | 56 |
| 17 days | 76 |

Subsequently, the solution was made alkaline by adding 2 drops of an aqueous solution containing 1 percent by weight sodium hydroxide, bringing the pH to 11.29. Thereafter, 1 gram of Duasyn Black RL-SF VP-228 (Reactive Black 31) dye was added and the solution was stirred and then heated to 60° C. for 30 minutes, followed by cooling to room temperature. The ink composition thus prepared had a surface tension of about 56.5 dynes per centimeter and a viscosity of 1.553 centipoise at room temperature. The resulting ink was incorporated into a Hewlett-Packard DeskJet 500 thermal ink jet printer and prints were generated on plain paper. The prints thus formed exhibited excellent edge quality, waterfastness, and smear-resistance, although it was also relatively slow-drying.

EXAMPLE IV

An ink composition was prepared as follows.

Bis(2-[10-undecenoyloxycarbonyl]-ethyl) methylamine hydrochloride was prepared by preparing a solution of 7.7 grams of N-methyliminobis(ethanol) in 50 milliliters of dimethylformamide and adding thereto 29 grams of 10-undecenoyl chloride (distilled). After the solution stood for 1 hour, the product spontaneously crystallized. Thereafter 160 milliliters of diethyl ether were added and the mixture was cooled to −10° C. and filtered. Subsequently, the product was recrystallized from 80 milliliters of ethyl acetate. The pure amine was obtained after extraction with sodium hydroxide in methylene chloride, yielding 31.4 grams of the product (89.2% yield).

To 2.5 grams of dimethyl sulfate were added 4.88 grams of the bis(2-[10-undecenoyloxycarbonyl]-ethyl) methylamine hydrochloride prepared as described above and the mixture was heated for 4 hours at 85° C. Thereafter, 50 milliliters of diethyl ether and 50 milliliters of methylene chloride were added and the resulting solution was extracted five times with a saturated aqueous solution of potassium bromide (total of 100 milliliters of KBr used). Subsequent solvent removal yielded 5.43 grams (99.4% yield) of the lipid bis(2-[10-undecenoyloxycarbonyl]-ethyl) dimethyl ammonium bromide.

405 milligrams of the lipid bis(2-[10-undecenoyloxycarbonyl]ethyl) dimethyl ammonium bromide and 12 milliliters of deionized water were admixed to form a suspension which was subjected to ultrasonication in an Ultrasonics Sonicator TM Model 350 (continuous pulse 50% cycles/7 micro tips). Subsequent to ultrasonication, the liposomes thus formed were polymerized by application for four hours of ultraviolet light (Oriel Model 6137 UV lamp, 200 WHg, available from Oriel Voltmeter) at room temperature. The light intensity, as measured with a Biospherical Instrument Inc. QSL 100, was $1.5 \times 10^{17}$ to $2.5 \times 10^{17}$ sec$^{-1}$ cm$^{-2}$. Thereafter, to the polymerized liposome mixture was added 6.99 milliliters of deionized water and 600 milligrams of Aizen Black 1000S Dye (a black anionic dye, available from Hodogaya Chemical Co., Ltd.) and the suspension was heated for 30 minutes at 50° C. with stirring. Thereafter, the mixture was stirred overnight at room temperature to result in an ink composition. The ink thus formed was incorporated into a Hewlett-Packard DeskJet 500 thermal ink jet printer and prints were generated on Xerox® 4024 plain paper, Ashdown 4200 plain paper, Hammermill plain paper, and Tidal DP plain paper. The prints thus formed exhibited excellent edge quality, optical density, and mid-frequency line edge noise (MFLEN).

Two additional black inks were prepared by the same procedure with the exception that in one instance the dye was Projet Black I (Direct Black 168, available from ICI Colors) and in the other instance the dye was Food Black 2 (available from Tricon Colors Inc.). These inks exhibited the same printing characteristics as the ink made with the Aizen Black dye.

EXAMPLE V

An ink composition was prepared as follows.

Bis(2-[10-undecenoyloxycarbolnyl]-ethyl) methylamine hydrochloride was prepared as described above in Example IV. To 6.85 grams of the bis(2-[10-undecenoyloxycarbonyl]-ethyl) methylamine hydrochloride was added 2.6 grams of 2-bromoethanol and the resulting mixture was heated for 4 hours at 85° C. Thereafter, the reaction mixture was crystallized with toluene (15 milliliters) and pentaria, yielding 2.1 grams (25% yield) of the lipid bis(2-[10-undecenoyloxycarbonyl]-ethyl) (2-hydroxyethyl) dimethyl ammonium bromide.

371 milligrams of the lipid bis(2-[10-undecenoyloxycarbonyl]ethyl) (2-hydroxyethyl) dimethyl ammonium bromide and 12 milliliters of deionized water were admixed to form a suspension which was subjected to ultrasonication in an Ultrasorties Sonicator TM Model 350 (continuous pulse 50% cycles/7 micro tips). Subsequent to ultrasonication, the liposomes thus formed were polymerized by application for four hours of ultraviolet light (Oriel Model 6137 UV lamp, 200 WHg, available from Oriel Voltmeter) at room temperature. The light intensity, as measured with a Biospherical Instrument Inc. QSL 100, was $1.5 \times 10^{17}$ to $2.5 \times 10^{17}$ sec$^{-1}$ cm$^{-2}$. Thereafter, to the polymerized liposome mixture was added 6.99 milliliters of deionized water and a few drops of a 1 percent by weight aqueous solution of sodium hydroxide was added to bring the pH of the mixture to between 9 and 10. To the mixture was then added 600 milligrams of Reactive Black 31 Dye (Duasyn Black, RL-SFVP, available from Hoechst AG) and the suspension was heated for 30 minutes at 60° C. with stirring. Thereafter, the mixture was stirred overnight at room temperature to result in an ink composition, followed by the addition of a few drops of a 1 Molar aqueous solution of hydrochloric acid to bring the pH to about 7. The ink thus formed was incorporated into a Hewlett-Packard DeskJet 500 thermal ink jet printer and prints were generated on Xerox® 4024 plain paper, Ashdown 4200 plain paper, Hammermill plain paper, and Tidal DP plain paper. The prints thus formed exhibited excellent edge quality and optical density and exhibited no kogation.

Other embodiments and modifications of the present invention may occur to those skilled in the art subsequent to a review of the information presented herein. These embodiments and modifications, as well as equivalents thereof, are also included within the scope of this invention.

What is claimed is:

1. An ink composition which comprises an aqueous liquid vehicle, a dye, and a vesicle-forming lipid, wherein vesicles of the lipid are present in the ink, wherein the vesicles have membranes of lipid molecules, wherein at least some of the lipid molecules are bonded to other lipid molecules in the membrane by a polymerization process.

2. An ink composition according to claim 1 wherein the vesicle-forming lipid is a glycerophospholipid.

3. An ink composition according to claim 2 wherein the vesicle-forming lipid is selected from the group consisting of phosphatidic acids, phosphatidylethanolamines, phosphatidylcholines, phosphatidylserines, phosphatidylinositols, phosphatidylglycerols, diphosphatidylglycerols, and mixtures thereof.

4. An ink composition according to claim 1 wherein the vesicle-forming lipid is a diacylglycerole.

5. An ink composition according to claim 1 wherein the vesicle-forming lipid is a α,ω-dipolar diacetyle.

6. An ink composition according to claim 1 wherein the vesicle-forming lipid is present in the ink in an amount of from about 0.5 to about 20 percent by weight.

7. An ink composition according to claim 1 wherein the vesicles have an average particle diameter of less than about 500 nanometers.

8. An ink composition according to claim 1 wherein the vesicles have an average particle diameter of less than about 200 nanometers.

9. An ink composition according to claim 1 wherein the vesicles are sterically stabilized and the lipid comprises a polyalkyl ether derivative.

10. An ink composition according to claim 1 wherein molecules of the dye are contained within the vesicles.

11. An ink composition according to claim 1 wherein the vesicles comprise at least two bilayered lipid membranes and molecules of the dye are contained between the membranes.

12. An ink composition according to claim 1 wherein the vesicles comprise at least one bilayered lipid membrane and molecules of the dye are contained between the layers of the membrane.

13. An ink composition according to claim 1 wherein the lipid has at least one cationic moiety and the dye has at least one anionic moiety.

14. An ink composition according to claim 1 wherein the lipid has at least one anionic moiety and the dye has at least one cationic moiety.

15. An ink composition according to claim 1 wherein molecules of the dye are covalently bonded to molecules of the lipid.

16. An ink composition according to claim 1 wherein the dye is a Reactive Dye.

17. A process for preparing an ink composition which comprises (a) admixing water and a vesicle-forming lipid having at least one functional group capable of reacting with a Reactive Dye, thereby causing vesicles of the lipid to form in aqueous solution; and (b) admixing the aqueous solution of lipid vesicles with a Reactive Dye at an alkaline pH, thereby causing the dye to become covalently bonded to the lipid vesicles.

18. A printing process which comprises incorporating into an ink jet printer an ink composition according to claim 1 and causing droplets of the ink to be ejected in imagewise pattern onto a substrate.

19. A printing process according to claim 18 wherein the ink jet printer is a thermal ink jet printer and wherein the ink is selectively heated in an imagewise pattern, thereby causing droplets of the ink to be ejected in an imagewise pattern.

20. A printing process which comprises incorporating into an ink jet printer a first ink composition which comprises a first aqueous liquid vehicle, a first dye, and a first vesicle-forming lipid, wherein vesicles of the first lipid are present in the first ink, wherein the vesicles have membranes of the first lipid molecules, wherein at least some of the first lipid molecules are bonded to other first lipid molecules in the membrane by a polymerization process, and a second ink composition which comprises a second aqueous liquid vehicle, a second dye, and a second vesicle-forming lipid, wherein vesicles of the second lipid are present in the second ink, wherein the vesicles have membranes of the second lipid molecules, wherein at least some of the second lipid molecules are bonded to other second lipid molecules in the membrane by a polymerization process, causing droplets of the first ink to be ejected in imagewise pattern onto a substrate heated to a temperature above about 25° C., and subsequently causing droplets of the second ink to be ejected in imagewise pattern onto the heated substrate.

21. An ink composition which comprises an aqueous liquid vehicle, a dye, and a vesicle-forming lipid, wherein vesicles of the lipid are present in the ink, wherein the vesicles comprise at least two bilayered lipid membranes and molecules of the dye are contained between the membranes.

22. An ink composition which comprises an aqueous liquid vehicle, a dye, and a vesicle-forming lipid, wherein vesicles of the lipid are present in the ink, wherein the lipid has at least one cationic moiety and the dye has at least one anionic moiety, and wherein the dye is ionically associated with the lipid.

23. An ink composition which comprises an aqueous liquid vehicle, a dye, and a vesicle-forming lipid, wherein vesicles of the lipid are present in the ink, wherein the lipid has at least one anionic moiety and the dye has at least one cationic moiety, and wherein the dye is ionically associated with the lipid.

24. An ink composition which comprises an aqueous liquid vehicle, a dye, and a vesicle-forming lipid, wherein vesicles of the lipid are present in the ink, wherein molecules of the dye are covalently bonded to molecules of the lipid.

25. A printing process which comprises incorporating into an ink jet printer an ink composition according to claim 21 and causing droplets of the ink to be ejected in imagewise pattern onto a substrate.

26. A printing process which comprises incorporating into an ink jet printer an ink composition according to claim 22 and causing droplets of the ink to be ejected in imagewise pattern onto a substrate.

27. A printing process which comprises incorporating into an ink jet printer an ink composition according to claim 23 and causing droplets of the ink to be ejected in imagewise pattern onto a substrate.

28. A printing process which comprises incorporating into an ink jet printer an ink composition according to claim 24 and causing droplets of the ink to be ejected in imagewise pattern onto a substrate.

* * * * *